Aug. 13, 1963    M. E. GRANT    3,100,713
METHOD OF PREPARING MEAT
Filed Nov. 16, 1959
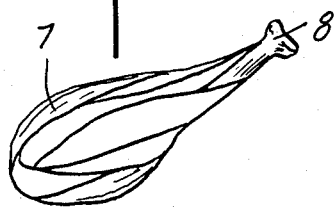
FIG. 1
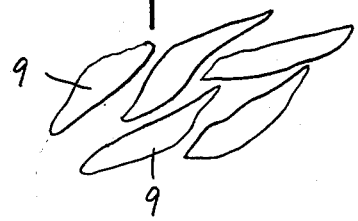
FIG. 2
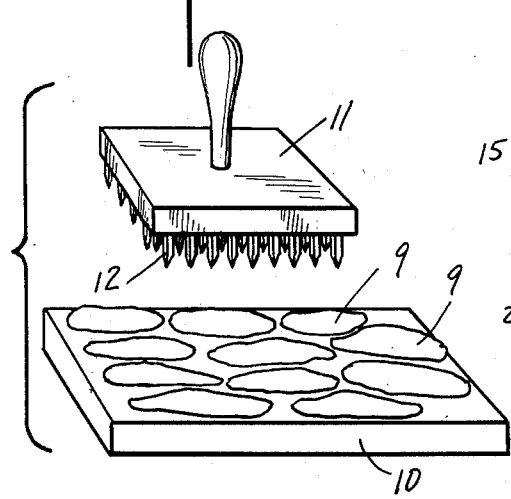
FIG. 3
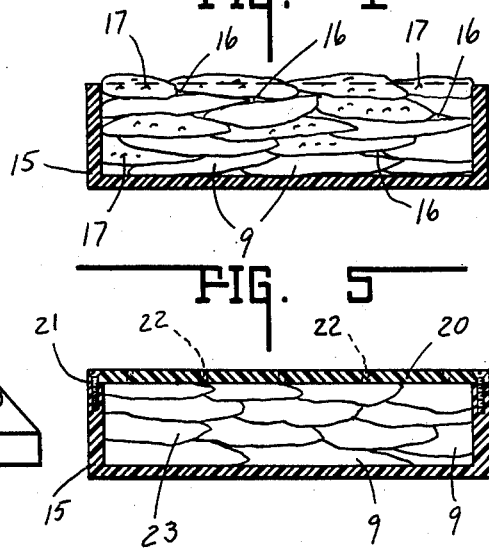
FIG. 4
FIG. 5
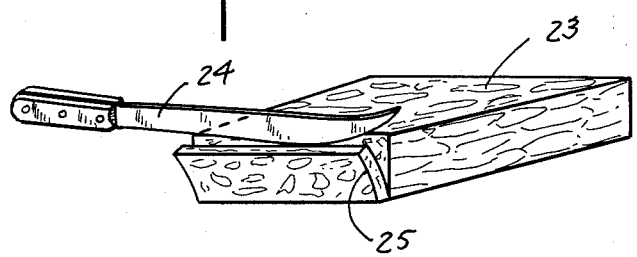
FIG. 6
INVENTOR.
MARO E. GRANT.
BY
Lockwood, Wooday, Smith & Weikart,
ATTORNEYS.

United States Patent Office 3,100,713
Patented Aug. 13, 1963

3,100,713
METHOD OF PREPARING MEAT
Maro E. Grant, R.R. 17, Box 574, Indianapolis, Ind.
Filed Nov. 16, 1959, Ser. No. 853,093
3 Claims. (Cl. 99—194)

The present invention relates to a method of preparing food and more particularly relates to a method of preparing fleshy cellular foods such as fowl and the meat of animals.

Mechanical tenderizing of meat is a well known process distinct from tenderizing with chemicals and involves the use of a device to grind, prick, punch, mash, crush or cube the meat. Hamburger is one example of a meat that is mechanically tenderized by grinding. It is desirable in some cases, however, to retain the unitary structure of meat in order that certain flavors will not be lost. One example might be the flavor of hamburger as opposed to the flavor of a mechanically tenderized steak. Thus, it might be said that an ideal mechanical tenderizing operation would involve cutting or punching in such a manner as to break down some of the connective tissues of the meat but in such a manner that the various portions of the meat are not completely severed from one another and the cellular structure of the meat is broken up as little as possible.

One disadvantage accruing from the mechanical tenderization of meat and fowl is that the outward configuration and appearance is changed. Some would say that this outward configuration of a mechanically tenderized food affects and changes the flavor of the food. This is, no doubt, one reason why many people prefer to eat, for example, a non-mechanically tenderized steak over a mechanically tenderized steak.

It is, therefore, a primary object of the present invention to provide a method of preparing fleshy cellular foods, such as chicken, in such a manner that the advantages of mechanical tenderizing are obtained without the accompanying disadvantages. Accordingly, the invention involves the step of mechanically tenderizing the food, for example, by a pricking or punching process, and the subsequent step of expanding the food by freezing within a mold whereby the original smooth outward configuration is returned to the food by its being forced against the surfaces of the mold.

A further object of the invention is to provide a method of preparing chicken and other fowl to produce a relatively large block or loaf of the fowl which may be cooked and sliced for serving, the loaf being prepared in such a manner that all of the bones are removed therefrom.

Still further objects and advantages will appear as the description proceeds.

The full nature of the invention will be understood from the accompanying drawings and the following description and claims:

FIG. 1 is a perspective view of a chicken drumstick having the chicken meat thereon.

FIG. 2 is a perspective view of a plurality of pieces of chicken meat having the bones removed therefrom.

FIG. 3 is a perspective view of a tenderizing device with a plurality of pieces of chicken meat arranged for tenderizing.

FIG. 4 is a vertical section of a mold having a plurality of pieces of chicken meat received therein.

FIG. 5 is a section similar to FIG. 4 additionally showing a cover secured to the mold and the chicken meat within the mold in an expanded frozen condition.

FIG. 6 is a perspective view showing slicing of a loaf of chicken meat produced according to the present invention.

Referring now to the drawings, this invention comprises a method wherein chicken meat 7, such as is on the drumstick 8 illustrated in FIG. 1, is prepared by removing all of the bones therefrom so as to produce the plurality of pieces 9 of chicken illustrated in FIG. 2. The chicken pieces are then placed upon a flat support 10 and are tenderized by punching the chicken with a tenderizing tool 11 having a plurality of pointed projections 12 extending therefrom. Alternatively, any commercial tenderizing machine may be used such as, for example, a machine including a plurality of knives for slicing the pieces of chicken without destroying the unitary structure thereof.

The pieces of tenderized chicken are then placed within a rigid mold 15 which may be formed of metal, plastic or any other suitable material. As can be seen from FIG. 4, the various pieces of chicken will have voids and air spaces 16 therebetween. The outward configuration of the chicken will be sliced or punched as indicated at 17 as a result of the tenderizing process. A rigid cover 20 is then secured to the mold by suitable screws 21 in the manner illustrated in FIG. 5. The cover 20 has a plurality of vents 22 therein which vent the inside of the mold to the atmosphere. With the rigid cover in place, however, on the rigid mold 15, a constant volume container is provided.

The chicken within the mold is then frozen causing it to expand and to close up the voids and interstices between the various pieces of chicken. The freezing process also causes the outer surfaces of the chicken to be forced against the walls of the mold so as to provide a smooth outward surface upon the chicken within the mold, and causes the various pieces of chicken to be forced against one another and to attach themselves to one another. It is believed that the various cuts and irregularities 17 produced by the tenderizing process will aid in causing the various pieces of chicken to attach themselves to one another. As a result of the freezing process there is produced an integrated loaf 23 of chicken meat having a smooth outer surface.

This integrated loaf of chicken meat produced according to the present invention may be sold and merchandised in conventional manner. When the housewife or other consumer purchases the loaf, it may be cooked whole or the loaf may be sliced raw by knife 24 in various sized portions. The slices, such as the slice 25, would then be cooked and may be placed in sandwiches or consumed in any other desired manner.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:

1. A method of preparing meat which comprises penetrating the meat at a plurality of points in order to tenderize the meat, then placing the meat within a rigid mold, then closing the mold with a rigid cover in such a manner as to provide a constant volume container for the meat, and then freezing the meat to expand it against the walls of the mold to smooth the outward surfaces of the meat.

2. A method of preparing chicken meat which comprises removing the bones from the meat, then penetrating the meat at a plurality of points in order to tenderize the meat, then placing the meat within a rigid vented mold, then closing the mold with a rigid cover in such a manner as to provide a constant volume container for the meat, and then freezing the meat to expand it against the mold to produce a solid integrated loaf having a smooth outward surface.

3. A method of preparing meat which comprises penetrating the meat at a plurality of points in order to tenderize the meat, then placing the meat within a mold, and then freezing the meat to expand it against the walls of mold, whereby the original smooth outward configuration is returned to the meat by its being forced against the surfaces of the mold.

References Cited in the file of this patent
UNITED STATES PATENTS

| | | |
|---|---|---|
| 1,950,763 | Walter | Mar. 13, 1934 |
| 2,020,843 | Lohner | Nov. 12, 1935 |
| 2,398,636 | Henney et al. | Apr. 16, 1946 |
| 2,709,658 | Buchanan | May 31, 1955 |
| 2,937,097 | Draudt et al. | May 17, 1960 |